Sept. 27, 1938. J. M. TURNAGE 2,131,649
HORN SIGNALING AND STEERING WHEEL SPINNING DEVICE
Filed July 10, 1937 2 Sheets-Sheet 1
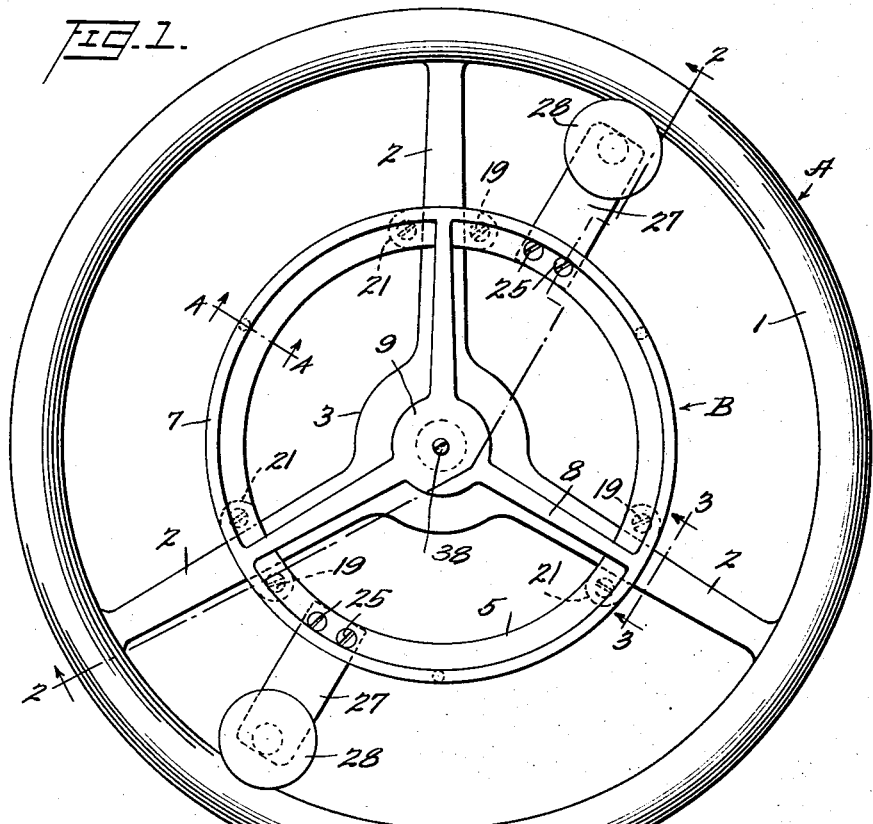
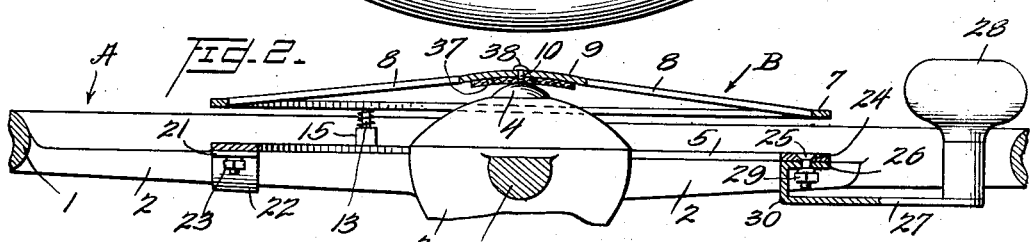
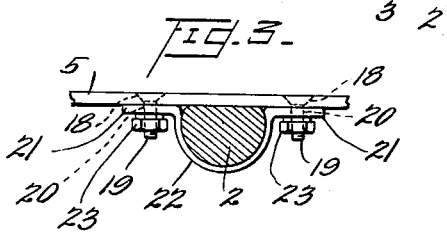
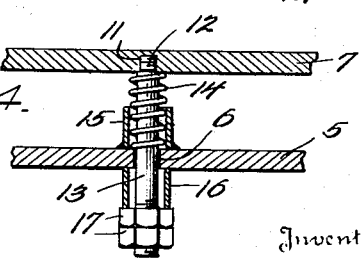
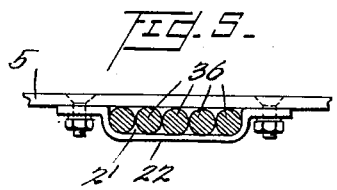

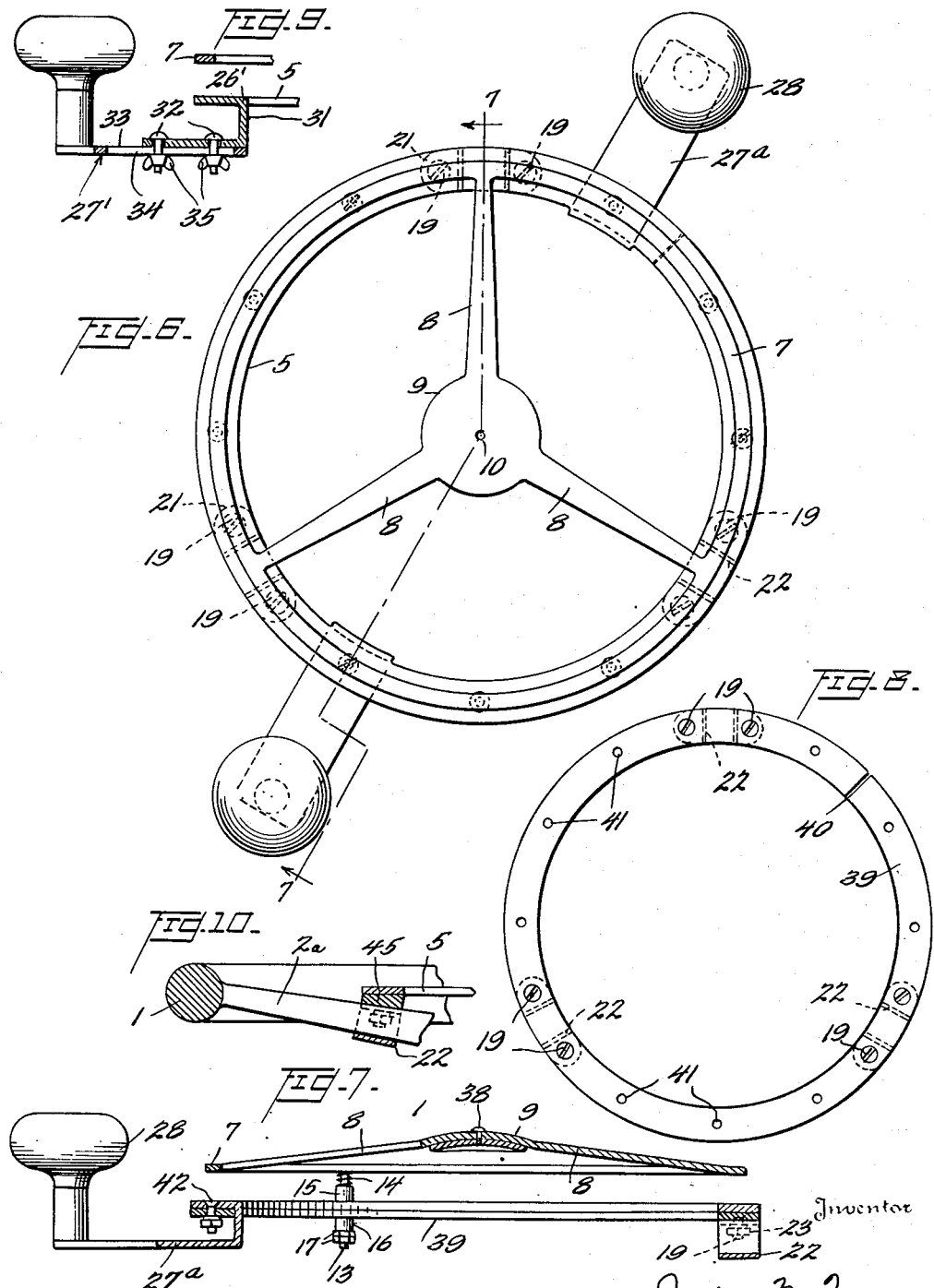

Patented Sept. 27, 1938

2,131,649

UNITED STATES PATENT OFFICE 2,131,649

HORN SIGNALING AND STEERING WHEEL SPINNING DEVICE

Julius M. Turnage, Richmond, Va.

Application July 10, 1937, Serial No. 153,035

8 Claims. (Cl. 74—484)

Generically this invention relates to a novel horn blowing device applicable to the steering wheels of automobiles, busses, trucks, boats, and airplanes, wherein the horn blowing mechanism may be operated at all times with either hand and without removing the hands from gripping relation with respect to the steering wheel.

One of the principal objects of this invention is the provision of a horn blowing unit attachable to steering wheels of self-propelled vehicles without change to existing structures, transferable from one vehicle to another as desired, and operable without removing the hands from the steering wheel or operable in the conventional manner from the center of the wheel, as desired.

A further important object of this invention is the provision of a horn operating unit adaptable to various types of steering wheels, including a depressible element coacting with the conventional horn button to effect blowing of the horn without removing the hands from the steering wheel, and while designed to not extend appreciably above the horn button or the steering wheel rim, reinforces the steering wheel structure without affecting the resiliency of the spokes and is immune to hand shock, vibration, and road shock while in operation during the course of travel movement of the automobile or other vehicle.

Another important object of the invention is the provision of a unit of this character attached to a steering wheel including grip means carried by the unit to enable spinning of the wheel quickly with one or both hands while turning around, turning corners, parking, and in case of emergency to avoid a collision, etc.

A further important object is the provision of a unit of this character attached to a steering wheel including grip means carried thereby attached to one or a pair of flexible metal arms for spinning the wheel in parking, making quick turns, or in cases of emergency to avoid a collision or the like, and so designed that in case the driver is accidently thrown against the wheel said arms carrying the gripping means or knobs will give or bend down thereby preventing injury to the driver.

A still further important object of this invention is the provision of safety means attachable to the steering wheels of automobiles for effecting under all conditions instant operation of the horn blowing apparatus without removing the hands from the steering wheel, and including hand gripping knobs for effecting spinning of the steering wheel in making emergency or quick turns, said means when force is applied in a downward direction at right angles to their normal rotating movement being depressible so as not to injure the driver in case of sudden stopping of the vehicle by reason of accident or otherwise.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a plan view of my improved horn operating and steering wheel spinning device operatively positioned on a steering wheel.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a view similar to Fig. 3 showing a modified form of attaching the device to a different steering wheel spoke structure.

Fig. 6 is a plan view of a modified form.

Fig. 7 is a section on the line 7—7 of Fig. 6.

Fig. 8 is a plan view of the adjustable supporting ring.

Fig. 9 is a sectional view showing a modified form of adjustable knob supporting arm.

Fig. 10 is a fragmentary view of a portion of a different type steering wheel showing the manner of attaching the device thereto.

The devices of this general character with which I am familiar have proven deficient in many respects, such as projecting substantially above the central horn button and the upper face of the steering wheel, presenting a depressible ring having rigid ring guide projections at points overlying the ring, clamp connections between the ring and spokes which tend to work the connected parts out of alignment, all of which affects the efficient operation of the horn, with the attendant danger of not only not working in case of emergency but in not preventing accidents by failure to instantly sound a warning, and spinning knobs rigidly mounted on the upper faces of the spokes or rim of the steering wheel adapted in case of accident to contribute to the injury of the driver, and it was to overcome such deficiencies and to provide a simple easily operated horn blowing unit mounted on the steering wheel without necessitating alterations to existing structures, operable under all conditions by either hand without removing the hands from the steering wheel, and including steering wheel spinning knobs carried by the unit adapted to be depressed if brought into sudden contact with the body of the driver, said device being so constructed and mounted as to be immune to vibration and hand shock, and also operable to effect blowing of the horn from the center of the steering wheel in the conventional manner, that I designed the device attachable to steering wheels of self-propelled vehicles constituting the subject matter of this invention.

In the illustrated embodiment characterizing this invention there is shown a steering wheel A, comprising a rim 1, spokes 2, and hub portion 3 having mounted therein a depressible horn blowing element or operating button 4, all of conventional construction.

The horn blowing device B comprises a metal ring 5 formed with a series of openings 6 in circumferential equi-spaced relation, and positioned above ring 5 in vertical spaced relation therewith is a depressible ring 7 with its outer circumferential edge in substantial vertical alignment with that of the supporting ring 5 and which is preferably of less width than said supporting ring, and formed in the present instance, with a trio of spokes 8 extending upwardly and inwardly and terminating in a central hub or cap plate 9 which is adapted to be positioned directly above or in normally non-operative contact with the horn button 4, and which is formed centrally with a perforation 10 for a purpose hereinafter more fully appearing.

Said ring 7 is formed with a plurality of countersunk threaded openings 11 in its under surface adapted to receive ends 12 of depending plunger pins 13 corresponding in number to the openings 6 in ring 5 through which they are adapted to movably extend. Mounted on said pins and adapted to maintain said ring 7 in resilient spaced relation with respect to ring 5 are the compression springs 14. Also mounted on said pins and surrounding said springs are the barrel washer spacer elements seating on ring 5 to limit the depressible movement of ring 7. Similar spacer elements 16 are mounted on the pins 13 adapted to seat against the under surface of ring 5 to limit the upward movement of ring 7, said pins being secured in operative position by a pair of lock nuts 17 threadedly engageable with said pins and adapted to engage the ends of spacer elements 16. Lock nuts 17 are adjustable on pins 13 to adjust the hub or cap plate 9 with respect to the horn button 4 and to control the tension of springs 14 whereby the sensitiveness of the ring structure 7 with respect to the operation of horn button 4 is controlled, as well as the limit of movement of structure B. Supporting ring 5 is preferably of heavier construction than ring 7 and is formed with a plurality of pairs of perforations 18 corresponding to the number of spokes 2 and adapted to preferably be countersunk to receive the heads of screws 19 which extend through the openings 20 in the ends 21 of the malleable clamps 22 adapted to engage around each of the spokes 2 and which are secured by nuts 23 threadedly engageable on the ends of screws 19, and as said nuts are tightened each of the clamps 22 will adjust itself to conform to the configuration of said spoke 2 so as to firmly secure said supporting ring and device B to steering wheel A, as will be apparent. With this construction, owing to the fact that device B is of unitary construction, it is impossible for said clamps to creep on the spokes 2 by reason of vibration or hand shock and move the device and coacting parts from their initial or operating positions. However, if for any reason shifting of ring 5 should take place and the unitary device move, nevertheless the operation of button 4 by depression from any point of ring 7, spokes 8, and hub 9 would still effect operation of button 4, as will be apparent.

While structure B is preferably constructed from nickel or chromium plated metal, it of course may be constructed from any other suitable material.

In this connection it is to be understood that while in the depressible ring structure the plate 9 is elevated above the horizontal plane of rim 1 to contact with button 4 that extends above the plane of ring 7, in cases where the button 4 is below the plane of rim 1 of the steering wheel or ring 7, the ring structure 7 may simply be inverted which will operate in the same manner as previously described.

At substantially diametrical opposite points supporting ring 5 is formed, in the present instance, with a pair of perforations 24 to receive screws 25, similar to screws 19 heretofore described, adapted to extend through ends 26 of arms 27 engageable with the under surface of ring 5, said arms adapted to extend downwardly at right angles and then outwardly at right angles to a point spaced from rim 1, and suitably and rotatably mounted on the ends of arms 27 are spinning knobs 28 which normally extend slightly above the plane of rim 1 but spaced sufficiently inwardly from said rim to permit the free passage of the hands of the driver when gripping the steering wheel so as to not interfere with the free movement of the hands, said arms being secured to ring 5 by nuts 29 threadedly adjustable on screws 25, as will be well understood. The knob-carrying arms 27 are formed of a material adapted to bend at points 30 when sudden force is applied against the upper surface of knobs 28 so that said arms will give, permitting depression of the knobs with respect to rim 1. This eliminates rigid protrusions above said rim in case the body of the driver is brought into sudden contact with the steering wheel, as will be well understood.

While I have preferably shown the arm structure 27, as shown in Fig. 2, it may be found desirable in connection with different sized steering wheels to have this arm adjustable, and consequently in Fig. 9 I have shown the arm 27' similar to arm 27 except that it is formed in two pieces, portion 31 with its end 26' connected to ring 5 and formed in its overlapping portion with openings through which are adapted to extend bolts 32, and the complemental portion 33 carrying rotary knob 28 is suitably superimposed on the overlapping portion of 31 and is formed with a longitudinal slot 34 through which extends bolts 32 securing the said members 33 and 31 together by wing nuts 35, whereby lateral adjustment of said knob 28 with respect to rim 1 and in accordance with different sized steering wheels is effected, as desired.

While I have preferably shown clamp member 22 as shown in Fig. 3, as applied to and conforming with the configuration of solid or tubular spokes 2, Fig. 5 illustrates clamp 22 as applied to and conforming with the configuration of the resilient type of spoke 2' comprising a plurality of resilient rods 36. Nevertheless, it will be noted that when the device B is mounted on a wheel formed with spokes 2' the normal resiliency of the spokes in a direction at right angles to said device B will not be affected, but on the other hand will be strengthened with respect to the movements of the steering wheel in a rotary direction.

As a general proposition the hub or plate 9, when the structure B is operatively positioned, is directly engageable with horn button 4, but depending upon the particular type of hub construction 3 it is sometimes found desirable to effect a further adjustment between member 9 and button 4 which is effected by a cup-like or curved member 37 carried by screw 38 extending through opening 10 and threadedly engageable with member 37, and if desirable suitable washers or shims may be inserted intermediate members 37 and 9. In this construction member 37 may also constitute a bearing engageable with button 9 in instances where the button is stationary with respect to wheel A, as will be well understood.

Without in anywise departing from the scope or spirit of the invention it has been found in some instances advantageous to provide a third ring or supporting element 39 severed as at 40 so as to permit installation of said ring under ring 5 by slipping said ring over arms 27 and, especially, 27a, said ring constituting a supporting element for ring 5 whereby the spinning knobs 28 may be positioned to normally rest in any desired position with respect to steering wheel A, and to accommodate, either right or left hand drivers, as the case may be. In order to effect such adjustment and also with respect to different numbers of spokes 2 and/or spoke construction, ring 39 is provided with an annular series of perforations 41 so spaced that certain of said openings are adapted to receive screw bolts 19 adapted to extend therethrough and through clamps 22 to firmly secure said ring 39 to steering wheel A, and permitting annular adjustment of said clamps 22 with respect to said rings. Certain of said openings 41 are adapted to register with openings 6 in ring 5 to receive pins 13, as shown in Fig. 7, and certain of said openings are adapted to receive screw bolts 42 extending through said openings, which in some instances may correspond to openings 24 in ring 5, to firmly lock said rings 5 and 39 in superimposed relation.

From the above it is apparent that ring 5 seating on ring 39 may be movably positioned with respect to the latter to shift the normal position of spinning knobs 28 to suit respective drivers and with reference to right hand or left hand drivers as desired.

In this connection it may be noted that arms 27a and ring 5 may be stamped from a suitable material and said arms bent downwardly and outwardly under ring 39 to support spinning knobs 28 as described in connection with arms 27, or if desired arms 27 instead of being secured directly to ring 5 may be similarly secured to the under surface of ring 39.

Further, it will be noted that ring 7 including spokes 8 and hub 9, ring 5 including arms 27a, and ring 39, may all be stamped from a suitable metallic material or formed from any suitable material as desired.

In instances where the spokes of the steering wheel extend downwardly from the rim, a substantially wedge-shaped spacer 45 is inserted between the top of radial arm 2a and ring 5 and adapted to receive screws 19 by which said ring is secured as above described.

While I have preferably described the device as an attachment, it may of course be built into the wheel structure during manufacture thereof, as desired.

While the operation of the device would seem to be clear from the above description, it might be well to further state that the device B may be quickly and easily installed on a steering wheel A of the majority of the types of steering wheel structures now in general use by simply mounting said device on the steering wheel with the member 9 overlying button 4, the spinning knobs 28 preferably positioned as shown in Fig. 1, and ring 5 rigidly secured to said wheel by self-adjusting clamp members 22 engageable about spokes 2 and secured to ring 5 by bolts 19 and nuts 23, whereupon the device is operatively positioned, and to effect blowing of the horn it is only necessary to slightly depress ring 7 against the action of springs 14, causing hub or plate 9 to engage and depress button 4, as will be well understood. To effect blowing of the horn it is immaterial whether the pressure is applied by the thumb, hand, or fingers to ring 7, spider arms 8, or hub 9, since pressure on any point of the spider structure formed by these elements will effect operation of button 4 and blowing of the horn as desired.

When structure B is mounted on steering wheel A as above described, spinning of the steering wheel may be effected by gripping either of the knobs 28 by either hand to turn the steering wheel, or by gripping the knobs by both hands, as desired, and during which operation the ring 7 may be depressed by the thumb of either hand to blow the horn in the same manner as when gripping the steering wheel.

From the above it will be observed that I have designed a device attachable as a unit to the various types of steering wheels of automobiles or other self-propelled vehicles, whereby the horn may be sounded by either hand and at any point with respect to the steering wheel without removing the hands therefrom, so constructed that operating parts and operation of the device is not affected by vibration, hand shock, continued usage, or sudden jolts by reason of rough vehicular travel, and which device may be easily installed, transferable from one vehicle to another, and having steering wheel spinning knobs carried thereby, the arms of which are designed to bend downwardly under the action of any substantial force applied to the upper surface of said knobs, thereby contributing to the safety of occupants of the automobile, and to that of pedestrians and vehicles approaching from the opposite direction by being able to instantly sound the horn when necessary without taking the hands from the steering wheel thereby tending to avoid accidents, and additionally tending to prevent injury to the driver by the spider-like formation of said device affording protection to the driver from the upper end of the steering column when brought into sudden engagement therewith. Also, said device is pleasing in appearance, simple in construction, manufacturable at a reasonable cost, and efficient for the purposes intended.

Although in practice it has been found that the form of the invention illustrated in the accompanying drawings and referred to in the above description as the preferred embodiment is the most efficient and practical, yet realizing that conditions concurrent with the adoption of the invention will necessarily vary, it is well to emphasize that various minor changes in details of construction, proportion and arrangement of parts, may be resorted to within the scope of the appended claims without departing from or sacrificing any of the principles of this invention.

Having thus described the invention, what is desired protected by Letters Patent is as set forth in the following claims:

1. A device for operating the depressible switch button on a vehicle steering wheel comprising a supporting ring adapted to be mounted on the spokes of said steering wheel, means for rigidly securing the ring to said spokes, and a ring structure connected to and resiliently spaced above said supporting ring and having means adapted to contact the button, whereby pressure applied to said structure at any point will effect operation of said switch and sounding of the horn.

2. A device for operating the depressible switch button on a vehicle steering wheel comprising a supporting ring adapted to be mounted on the radial arms of said steering wheel, means for rigidly securing the ring to said arms, and a depressible structure adapted to coact with said switch vertically spaced with respect to said supporting ring, resilient means between said structure and supporting ring, and adjustable means connecting said structure and supporting ring whereby pressure applied to said structure at any point will effect operation of said switch and sounding of the horn.

3. A device for operating the depressible switch button on a vehicle steering wheel comprising a supporting means adapted to be rigidly connected to said steering wheel, a depressible ring structure adapted to coact with said switch, means adjustably connecting said ring structure and supporting means, resilient means associated with said connecting means adapted to maintain said structure and supporting means in spaced relation, and means associated with said depressible connecting means for limiting the movement of said ring structure.

4. A device for operating the depressible switch button on a vehicle steering wheel comprising a supporting element adapted to be carried by and connected to the steering wheel spokes, means for rigidly securing the supporting element to said spokes, a depressible ring yieldably supported and vertically spaced from the supporting element, and depressor means supported by the depressible ring and adapted to coact with the depressible switch button.

5. A combination wheel spinning and horn switch button depressor comprising a supporting ring adapted to be carried by the steering wheel, means for rigidly securing the supporting ring to said wheel, a spinning knob supported by and offset from the supporting ring, a depressible ring yieldably and vertically supported with respect to the supporting ring, and depressor means supported by the depressible ring and adapted to coact with the depressible switch button.

6. A combination wheel spinning and horn button depressor device adapted to be mounted on the steering wheel as a unit comprising a supporting member adapted to rest upon and be rigidly secured to the steering wheel, a depressible ring yieldably supported in vertically spaced relation with respect to the supporting member, depressor means carried by the depressible ring and adapted to engage the depressible horn button of the steering wheel, a pair of spinning arms rigidly secured at circumferentially spaced points to the supporting member, and rotatable operating knobs carried by the free ends of the spinning arms.

7. A device for operating the depressible switch button on a vehicle steering wheel comprising a supporting ring, a yieldable depressible ring supported in spaced relation with respect to said supporting ring, depressor means supported by the depressible ring and adapted to coact with the depressible switch button, an adjustable split base ring resting on and rigidly connected to the spokes of said steering wheel adapted to supportingly engage said supporting ring, and means for adjustably connecting said supporting ring and base ring, whereby annular adjustment of said supporting ring with respect to the steering wheel may be effected.

8. A device for operating a depressible switch button on a vehicle steering wheel comprising a supporting means, a yieldable depressible ring structure supported vertically spaced from said supporting means and adapted to coact with said switch, guide means for adjustably connecting said ring structure and supporting means, adjustable steering wheel spinning means connected to said supporting means, said spinning means adapted to be depressed when force is applied thereto at right angles to the plane of the steering wheel spinning movement.

JULIUS M. TURNAGE.